May 20, 1930.   S. A. HARN   1,759,552
STRAW SPREADING ATTACHMENT
Filed Feb. 1, 1929   2 Sheets-Sheet 1
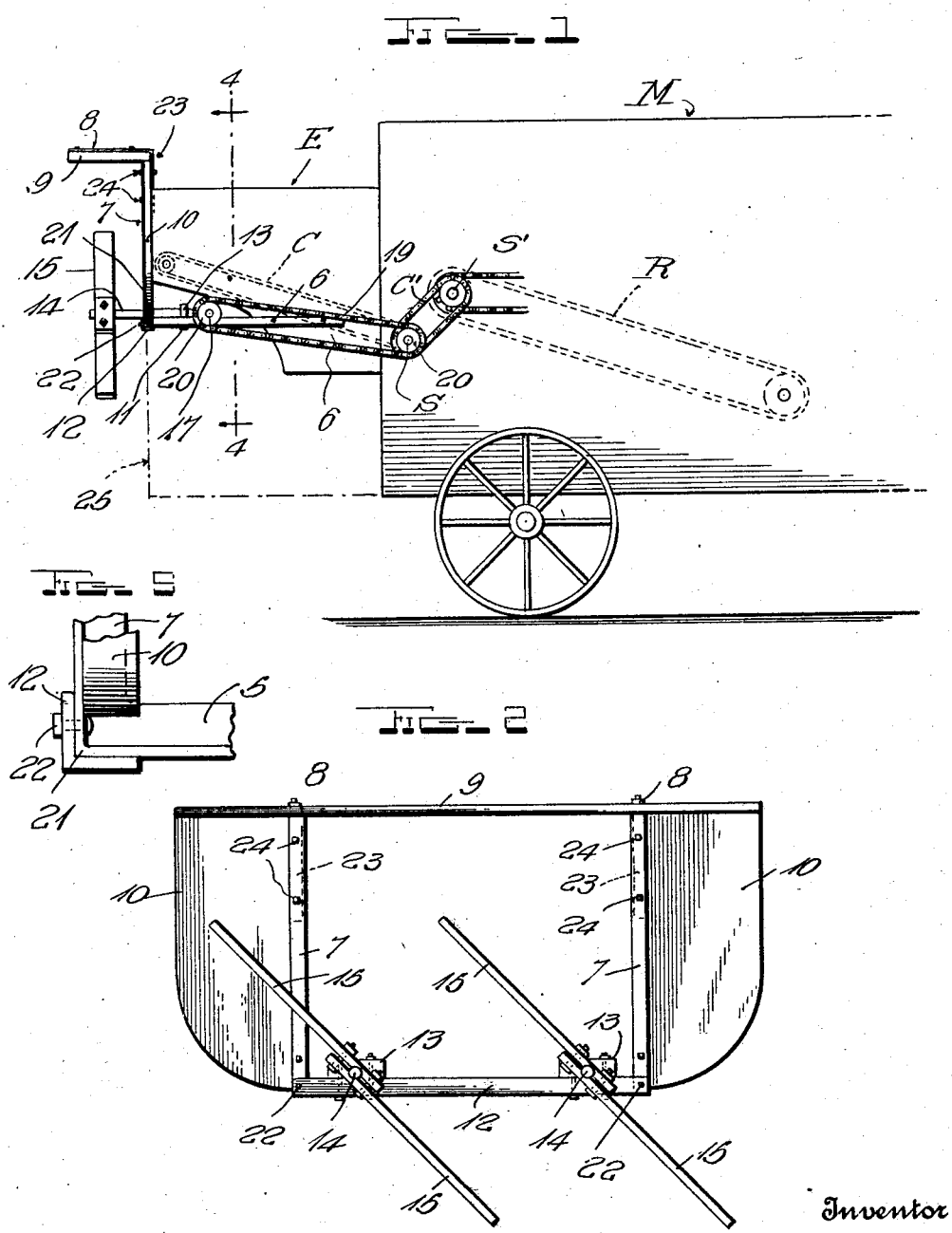
Witness
Inventor
Sherman A. Harn,
By H. B. Willson &Co
Attorneys

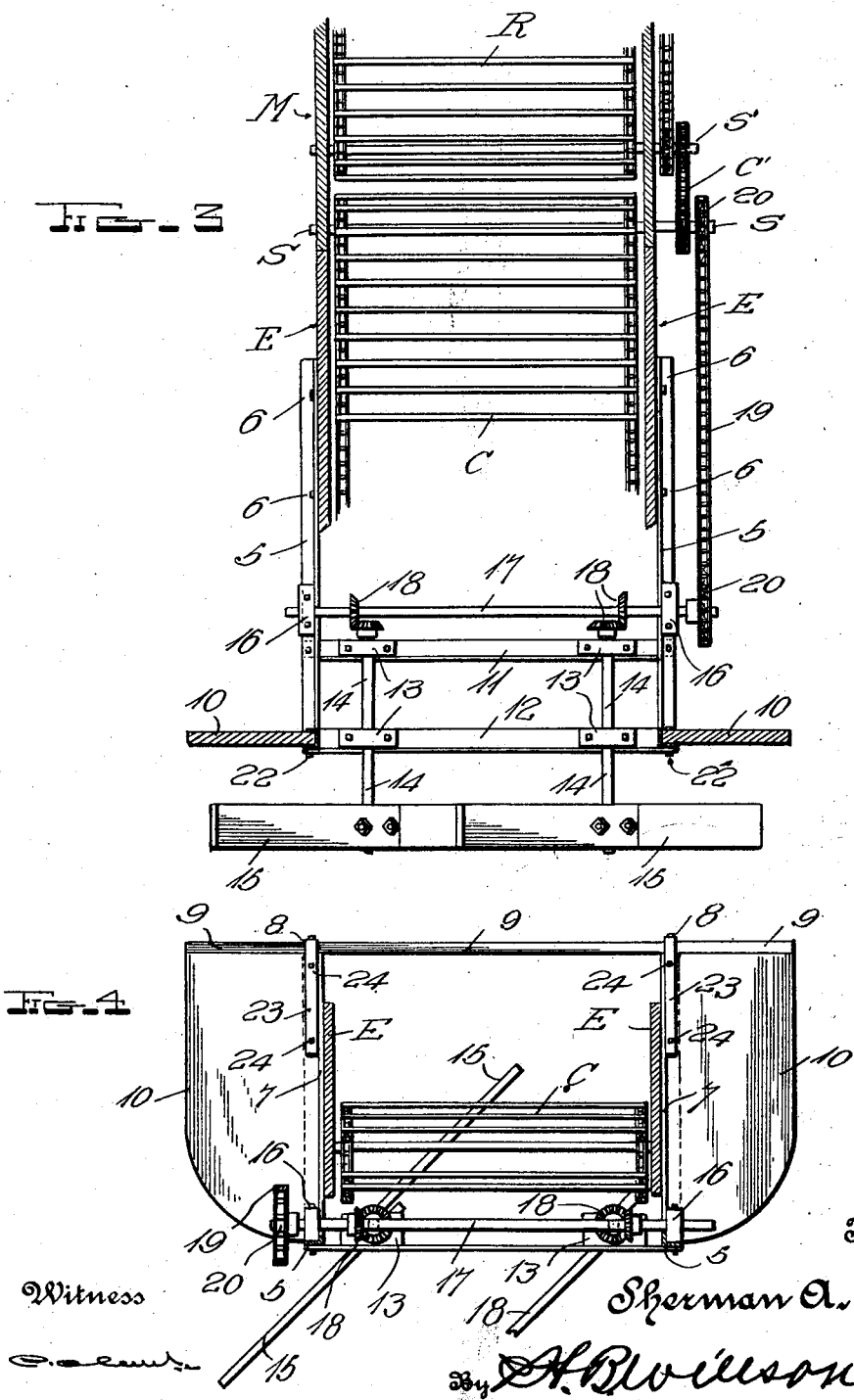

Patented May 20, 1930

1,759,552

UNITED STATES PATENT OFFICE

SHERMAN A. HARN, OF WATERVILLE, WASHINGTON

STRAW-SPREADING ATTACHMENT

Application filed February 1, 1929. Serial No. 336,723.

The invention relates to straw spreading attachments for combined harvesting and threshing machines and it is the object of said invention to generally improve upon the construction shown by my U. S. Patent No. 1,349,152 of August 10, 1920.

With the foregoing in view, the invention resides in the novel subject matter hereinafter described and claimed, description being accomplished by reference to the accompanying drawings.

Fig. 1 is a side elevation of a combined machine equipped with the attachment.

Fig. 2 is a rear elevation of the attachment disconnected from the machine.

Fig. 3 is a top plan view partly in horizontal section.

Fig. 4 is a vertical transverse sectional view on line 4—4 of Fig. 1.

Fig. 5 is an enlarged detail side elevation.

The form of construction herein disclosed may be considered as preferred and while this construction will be specifically explained, it is to be understood that within the scope of the invention as claimed, minor variations may be made.

M denotes a combined harvesting and threshing machine provided near its rear end with the usual "rattle rake" R. The machine M is provided with an extension E which projects rearwardly beyond the "rattle rake" R and in this extension, a conveyor C is mounted for rearwardly carrying the straw and chaff received from said "rattle rake". One of the shafts S of the conveyor C is driven by a chain C' from one of the shafts S' of the "rattle rake" R, and I utilize the shaft S also in driving the straw spreading attachment hereinafter described.

The attachment embodies two parallel longitudinal bars 5 to be secured by bolts or the like 6 to the sides of the extension E. Secured to and rising rigidly from the rear ends of the bars 5, are two vertical bars 7 whose upper ends are provided with rearwardly projecting horizontal arms 8. A transverse horizontal shield board 9 is secured to these arms 8 and two vertical shield boards 10 are secured at their upper ends to said board 9, the inner edges of said boards 10 being secured to the vertical bars 7. The two shield boards 10 are disposed in a transverse vertical plane.

Two transverse bars 11 and 12 extend between and are rigidly secured to the bars 5, the bar 12 being disposed at the rear ends of said bars 5. Bearings 13 are mounted on the transverse bars 11 and 12, said bearings supporting two parallel longitudinal shafts 14 whose rear ends are provided with straw beaters 15 disposed under the shield board S and behind the boards 7. Additional bearings 16 are mounted on the longitudinal bars 5 for supporting a transverse drive shaft 17 which is operatively connected by gearing or the like 18 with the shafts 14, said shafts 17 being driven by a chain 19 and sprockets 20, from the shaft S above described.

In the preferred construction, all of the bars 5—7—11—12 are formed from angle metal and each bar 5 and the associated bar 7 are formed by bending a single length of said metal at right angles. Each right angular bend is denoted at 21 and if in making such bend, it be necessary to cut or notch one of the bar flanges, this weakness is overcome by again welding the flange portions together. The two right angular bends 21 are seated within the angle of the rearmost transverse bar 12 and the latter is secured by bolts or the like 22. Certain flanges of the bars 7 preferably project laterally outward and the boards 10 are bolted or otherwise secured against the front sides of these flanges. Vertical bar portions 23 preferably lie against the front sides of these boards 10 and at their upper ends are integral with the arms 8, bolts 24 being passed through said flanges, said boards and said bar portions 23.

The attachment may be easily connected with the machine and when in use all straw rearwardly delivered by the conveyor C is effectively distributed by the beaters 15. If it be desired to save any chaff falling from the straw before it reaches these beaters, a receptacle such as that indicated at 25 in dotted lines may be provided.

Excellent results have been obtained from the details disclosed and they are therefore preferably followed. Attention is again invited to the fact however, that within the scope of the invention as claimed, variations may be made.

I claim:—

1. A straw spreading attachment for a traveling machine, comprising two parallel longitudinal bars for attachment to the rear of the machine, a rear transverse bar extending between and secured to the rear ends of said longitudinal bars, a front transverse bar secured also to said longitudinal bars, two vertical bars secured to and rising from said rear ends of said longitudinal bars, two arms secured to the upper ends of said vertical bars respectively and projecting rearwardly therefrom, a transverse horizontal shield board secured to said arms, two vertical shield boards, the latter being secured at their inner edges to said vertical bars and at their upper ends to said horizontal board, two longitudinal shafts having bearings mounted on said transverse bars, said shafts having beaters behind said vertical boards and under said horizontal board, and driving means for said shafts.

2. A structure as specified in claim 1; said longitudinal and vertical bars being formed from two angle metal bars each having a right angular bend between its ends, said rear transverse bar being of angle metal with its angle receiving said right angular bends.

3. A straw spreading attachment for a traveling machine, comprising two parallel longitudinal bars for attachment to the rear of the machine, two transverse bars secured at their ends to said longitudinal bars, one of said transverse bars being disposed at the rear ends of said longitudinal bars, two vertical bars secured to and rising from said rear ends of said longitudinal bars, two horizontal arms secured to the upper ends of said vertical bars respectively and projecting rearwardly therefrom, a transverse horizontal shield board secured to said arms, two vertical shield boards disposed in a transverse plane, said vertical boards being secured at their inner edges to said vertical bars and at their upper ends to said horizontal board, two longitudinal shafts mounted upon said transvese bars and provided with beaters behind said vertical boards and under said horizontal board, and a transverse drive shaft operatively connected with said longitudinal shafts and mounted upon said longitudinal bars.

4. A structure as specified in claim 3; said longitudinal and vertical bars being formed from two angle metal bars each having a right angular bend between its ends, at least the rearmost of said transverse bars being of angle metal with its angle receiving said right angular bends.

In testimony whereof I have hereunto affixed my signature.

SHERMAN A. HARN.